US006799779B2

United States Patent
Shibayama

(10) Patent No.: US 6,799,779 B2
(45) Date of Patent: Oct. 5, 2004

(54) SHOCK-ABSORBING TILT TYPE STEERING COLUMN

(75) Inventor: Kazuya Shibayama, Shizuoka (JP)

(73) Assignee: Fuji Kiko Co., Ltd., Kosai (JP)

( * ) Notice: Subject to any disclaimer, the term of this patent is extended or adjusted under 35 U.S.C. 154(b) by 135 days.

(21) Appl. No.: 10/277,096

(22) Filed: Oct. 22, 2002

(65) Prior Publication Data

US 2003/0085560 A1 May 8, 2003

(30) Foreign Application Priority Data

Oct. 23, 2001 (JP) ......................................... 2001-324426

(51) Int. Cl.⁷ .............................. B62D 1/18; B62D 1/19
(52) U.S. Cl. ....................................... 280/777; 280/775
(58) Field of Search ................................. 280/777, 775; 74/493; B62D 1/19

(56) References Cited

U.S. PATENT DOCUMENTS

| | | | |
|---|---|---|---|
| 4,901,592 A | | 2/1990 | Ito et al. |
| 6,039,350 A | * | 3/2000 | Patzelt et al. ............... 280/775 |
| 6,237,954 B1 | * | 5/2001 | Sato et al. .................. 280/775 |
| 6,467,807 B2 | * | 10/2002 | Ikeda et al. ................. 280/775 |
| 2002/0033593 A1 | * | 3/2002 | Hancock et al. ............ 280/777 |
| 2003/0075913 A1 | * | 4/2003 | Li et al. ...................... 280/777 |

FOREIGN PATENT DOCUMENTS

| | | |
|---|---|---|
| EP | 0 928 733 A2 | 7/1999 |
| EP | 1 223 096 A1 | 7/2002 |
| FR | 2 775 648 A1 | 9/1999 |
| FR | 2 784 343 A1 | 4/2000 |
| JP | 7-215221 A | 8/1995 |
| JP | 8-295251 A | 11/1996 |
| JP | 9-169279 A | 6/1999 |

\* cited by examiner

*Primary Examiner*—Ruth Ilan
(74) *Attorney, Agent, or Firm*—Foley & Lardner LLP

(57) ABSTRACT

A shock-absorbing tilt type steering column is disclosed. An upper clamp includes a first side wall and a second side wall formed respectively with a first hole and a second hole. A coupler is inserted into the first and second holes. The first and second side walls have such a height that lower ends are disposed on a level with or above a lowermost section of a column jacket when the coupler is disposed in uppermost positions of the first and second holes. A distance bracket coupling with the column jacket is so sandwiched between the first and second side walls as to move upward and downward, and engages with the coupler in such a manner as to disengage from the coupler when a load over an upper limit is applied in a direction along the column jacket. An energy absorber is interposed between the distance bracket and the coupler.

19 Claims, 6 Drawing Sheets

SHOCK-ABSORBING TILT TYPE STEERING COLUMN

BACKGROUND OF THE INVENTION

1. Field of the Invention

The present invention relates to a tilt type steering column for a motor vehicle. Especially, the present invention relates to a shock-absorbing mechanism of the tilt type steering column.

2. Description of the Related Art

A tilt type steering column allows a steering wheel to move upward and downward so as to secure a proper driving position (attitude) of a seat occupant. The tilt type steering column can have the following construction:

A distance bracket is fixed to the tilt type steering column. A tilt bolt is inserted into the distance bracket. A support bracket otherwise referred to as "upper clamp" or "upper bracket" is fixed to a vehicular body. The tilt bolt has a first end and a second end which engage respectively with a first elongate hole {formed upward and downward in a first side wall of the support bracket} and a second elongate hole {formed upward and downward in a second side wall of the support bracket}. Thereby, the tilt bolt can slidably move upward and upward, or can be fixed in a predetermined position for tilt adjustment.

For securing the seat occupant's safety in an accident (collision) of the motor vehicle, the shock-absorbing mechanism of the tilt type steering column can have the following functions:

The tilt type steering column can absorb a shock energy which may be caused in a primary collision (namely, a collision of the vehicular body with another vehicular body, an obstacle and the like), and a secondary collision (namely, a collision of the seat occupant with the tilt type steering wheel) attributable to the primary collision, thereby reducing as much as possible or absorbing a load applied to the seat occupant.

The shock-absorbing tilt type steering column has various constructions. As is seen in FIG. 7, Japanese Patent Unexamined Publication No. Heisei 8 (1996)-295251 (=JP8295251) discloses a shock-absorbing tilt type steering column. A steering shaft 19 is rotatably supported by a bearing 20 of a column jacket 21. A support bracket 22 is formed with a vehicular body mounting section 23. The column jacket 21 has a rear end side which is secured to the vehicular body by way of the vehicular body mounting section 23. A distance bracket 24 coupling with the column jacket 21 is formed with an engagement groove 25 opening rearward.

The tilt bolt 26 engages with the engagement groove 25 in such a manner that the tilt bolt 26 can disengage from the engagement groove 25 when an excessive load {greater than an allowable load (upper limit)} is applied to the distance bracket 24. The support bracket 22 has a side wall 27 which is formed with an elongate hole 28. The tilt bolt 26 engages with the elongate hole 28, thus allowing the distance bracket 24 to slide upward and downward. Moreover, operating a tilt lever 29 allows the support bracket 22 to tighten and/or relax the distance bracket 24.

Herein, the shock-absorbing mechanism has the following construction:

An energy absorber 30 has a rear end (right in FIG. 7) formed with a fixture end 31 which couples with the distance bracket 24 through a welding and the like. The fixture end 31 is shaped substantially into a key. The rear end of the energy absorber 30 also has a bent section 32 which is so shaped substantially into an English alphabet "U" as to wind about the tilt bolt 26. The energy absorber 30 made of metal is a strap having a predetermined length, and extends forward (leftward in FIG. 7) along the column jacket 21.

In the secondary collision, the above shock-absorbing mechanism can bring about the following effects:

The excessive load {greater than the allowable load (upper limit)} applied axially from the steering shaft 19 to the column jacket 21 by way of the bearing 20 causes the distance bracket 24 to disengage from the tilt bolt 26. Thereby, the tilt bolt 26 which keeps engagement with the support bracket 22 causes plastic deformation to the energy absorber 30, thus absorbing the shock.

With the shock-absorbing tilt type steering column according to the Japanese Patent Unexamined Publication No. Heisei 8 (1996)-295251 (=JP8295251), however, the side wall 27 of the support bracket 22 is in need of a certain dimension for allowing the elongate hole 28 (opening in the side wall 27) to secure a predetermined space for tilting the steering column. Thereby, the side wall 27 dangling downward from the vehicular body mounting section 23 of the support bracket 22 becomes greater than the elongate hole 28 in overall dimension. As a result, a lower section of the support bracket 22 may touch the seat occupant's knee or thigh, thus discomforting the seat occupant.

Moreover, the energy absorber 30 is partly exposed below the support bracket 22. The energy absorber 30 plastically deformed in the secondary collision may also touch the seat occupant's knee or thigh. For preventing the energy absorber 30 from touching the seat occupant's knee or thigh, a cover and the like is supposed to add to the lowermost position of the support bracket 22, resulting in further diminished space above the seat occupant's knee or thigh.

BRIEF SUMMARY OF THE INVENTION

It is an object of the present invention to provide a shock-absorbing tilt type steering column for a motor vehicle.

It is another object of the present invention to allow the shock-absorbing tilt type steering column to have safe and sufficient space above the seat occupant's knee or thigh.

According to a first aspect of the present invention, there is provided a shock-absorbing tilt type steering column, comprising:

1) a column jacket having a lowermost section, a space being defined above the column jacket;
2) a coupler;
3) an upper clamp including a pair of a first side wall and a second side wall formed respectively with a first hole and a second hole for tilting the shock-absorbing tilt type steering column, the coupler being inserted into the first hole and the second hole, the space defined above the column jacket being defined in the upper clamp, each of the pair of the first side wall and the second side wall having such a height that a lower end thereof is disposed substantially on a level with or higher than the lowermost section of the column jacket when the coupler is disposed in an uppermost position of each of the first hole and the second hole;
4) a distance bracket sandwiched between the first side wall and the second side wall of the upper clamp in such a manner as to move upward and downward, the distance bracket coupling with the column jacket, the distance bracket being adapted to engage with the coupler in such a manner as to be disengageable from the coupler in a forward direction of a vehicle when a load greater than an upper limit is applied to the distance bracket axially in a direction along the column jacket, the distance bracket being disposed in the space with the lower end of each of the first side wall and the second side wall disposed substantially on the level with or higher than the lowermost section of the column jacket; and 5) an energy absorber interposed between the distance bracket and the coupler.

According to a second aspect of the present invention, there is provided a shock-absorbing steering system, comprising:

1) a column jacket shaped substantially into a cylinder having a lowermost section, the column jacket defining a center section and a front end side, a space being defined above the column jacket;

2) a coupler;

3) an upper clamp disposed in the center section of the column jacket, the upper clamp including a pair of a first side wall and a second side wall formed respectively with a first hole and a second hole, the coupler being inserted into the first hole and the second hole, the space defined above the column jacket being defined in the upper clamp, each of the pair of the first side wall and the second side wall having such a height that a lower end thereof is disposed substantially on a level with or higher than the lowermost section of the column jacket when the coupler is disposed in an uppermost position of each of the first hole and the second hole;

4) a distance bracket sandwiched between the first side wall and the second side wall of the upper clamp in such a manner as to move upward and downward, the distance bracket coupling with the column jacket, the distance bracket being adapted to engage with the coupler in such a manner as to be disengageable from the coupler in a forward direction of a vehicle when a load greater than an upper limit is applied to the distance bracket axially in a direction along the column jacket, the distance bracket being disposed in the space with the lower end of each of the first side wall and the second side wall disposed substantially on the level with or higher than the lowermost section of the column jacket;

5) an energy absorber interposed between the distance bracket and the coupler; and 6) a lower clamp disposed on the front end side of the column jacket.

The other objects and features of the present invention will become understood from the following description with reference to the accompanying drawings.

BRIEF DESCRIPTION OF THE SEVERAL VIEWS OF THE DRAWINGS

FIG. 5 shows a distance bracket 11, in which

FIG. 6 shows an energy absorbing mechanism including the distance bracket 11 and an energy absorber 12, in which

DETAILED DESCRIPTION OF THE EMBODIMENT

Figure 1:
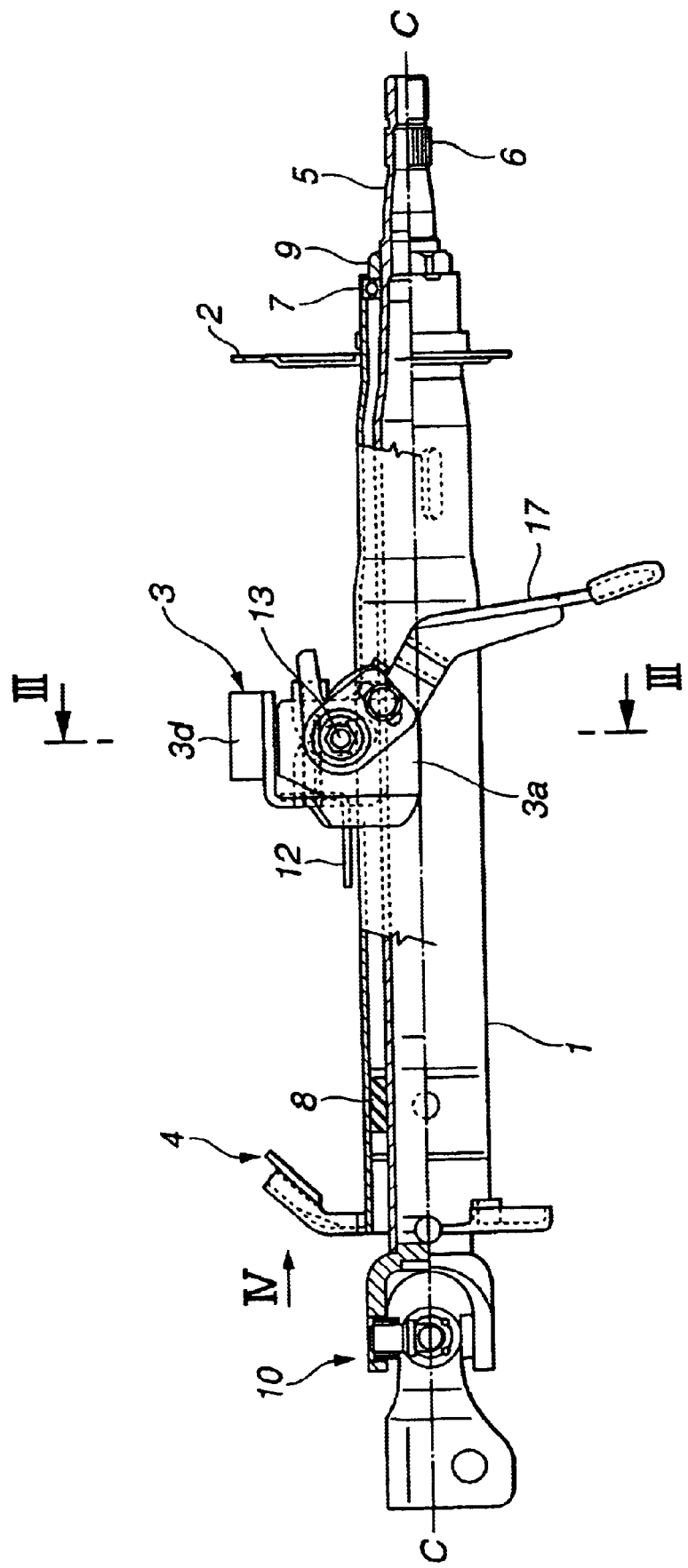
FIG. 1 is a side view of a shock-absorbing tilt type steering column showing partly a cross section, according to an embodiment of the present invention.

In the following, various embodiments of the present invention will be described in detail with reference to the accompanying drawings.

For ease of understanding, the following description will contain various directional terms, such as, left, right, upper, lower, forward, rearward and the like. However, such terms are to be understood with respect to only a drawing or drawings on which the corresponding part of element is illustrated.

In addition, some members described in the following embodiment have, if desired, suffixes "F" denoting first and "S" denoting second. With this, each of the members can be properly distinguished from its counterpart. Each of "F" and "S" is to be suffixed to a numeral following the member.

As is seen in FIG. 1 to FIG. 4, there is provided a column jacket 1 which is formed through a drawing into a stepped cylinder. The column jacket 1 defines a rear end side (right in FIG. 1) to which a unit mounting bracket 2 is fixed. An upper clamp 3 which acts as a support bracket supports substantially a center section of the column jacket 1 to a vehicular body. The column jacket 1 defines a front end side (left in FIG. 1) which is supported to the vehicular body by means of a lower clamp 4. A steering shaft 5 is inserted into the column jacket 1 concentrically with the column jacket 1.

Like the column jacket 1, the steering shaft 5 is formed through the drawing into a stepped cylinder. The steering shaft 5 defines a rear end side (right in FIG. 1) which is formed with an engagement section 6 for mounting a steering wheel. In the vicinity of the engagement section 6, there is provided a bearing 7 which is disposed at the rear end of the column jacket 1 in such a manner as to be interposed between the column jacket 1 and the steering shaft 5. A rubber bush 8 is interposed between a front end side of the steering shaft 5 and the front end side of the column jacket 1, in such a manner that the steering shaft 5 is rotatable about an axis of the column jacket 1. A stopper 9 (nut) abutting on the bearing 7 is fitted to the rear end side of the steering shaft 5. The front end side of the steering shaft 5 can connect to an intermediary shaft (not shown) by way of a universal joint 10.

A shock-absorbing mechanism is adopted into the upper clamp 3 and the lower clamp 4.

Figure 3:
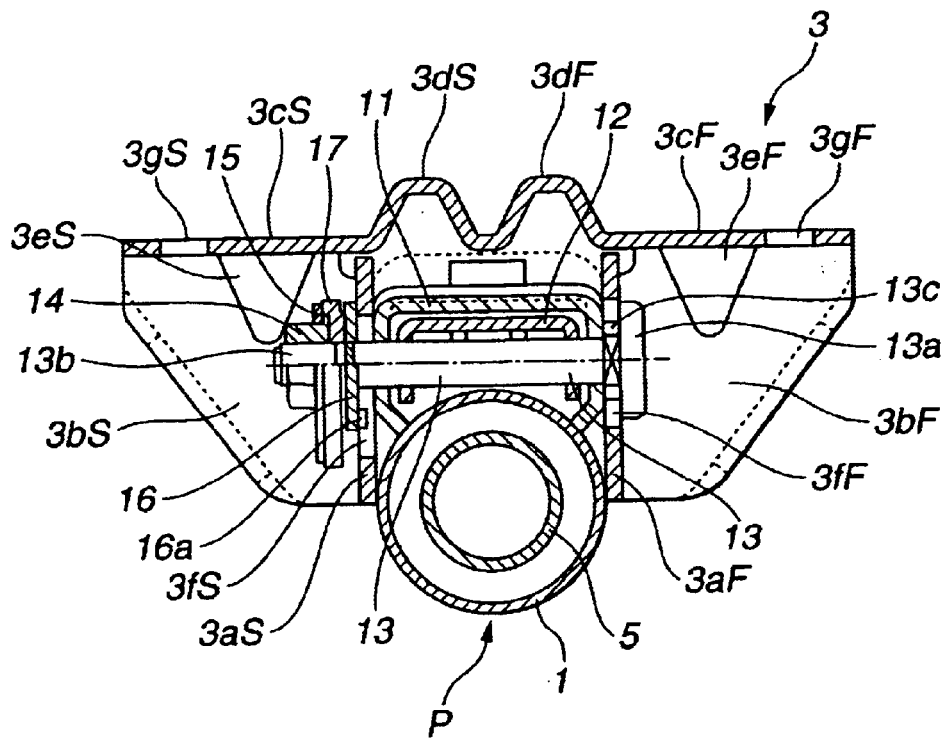
FIG. 3 is a cross section taken along the lines III—III in FIG. 1.

More specifically, as is seen in FIG. 3, the upper clamp 3 includes a pair of a first side wall 3aF and a second side wall 3aS, a pair of a first front wall 3bF and a second front wall 3bS, and a pair of a first vehicular body fixture 3cF and a second vehicular body fixture 3cS. The upper clamp 3 can be formed in the following manner:

One metal plate is folded into two separate side walls, that is, the first side wall 3aF and the second side wall 3aS.

The first front wall 3bF unites with the first side wall 3aF, while the second front wall 3bS unites with the second side wall 3bS. The first vehicular body fixture 3cF unites with an upper section of the first front wall 3bF, while the second vehicular body fixture 3cS unites with an upper section of the second front wall 3bS. Each of the first vehicular body fixture 3cF and the second vehicular body fixture 3cS faces a vehicular body mounting section (not shown in FIG. 3).

Moreover, the upper clamp 3 is formed with a pair of a first reinforcement 3eF and a second reinforcement 3eS. The first reinforcement 3eF is so machined as to reinforce a first fold section defined between the first front wall 3bF and the first vehicular body fixture 3cF, while the second reinforcement 3eS is so machined as to reinforce a second fold section defined between the second front wall 3bS and the second vehicular body fixture 3cS.

With the construction of the upper clamp 3 described above, varying the upper clamp 3 (in thickness) and the first reinforcement 3eF and the second reinforcement 3eS (in size) can contribute to determination of an allowable load which may be applied to the first front wall 3bF and the second front wall 3bS. Hereinabove, the allowable load is defined as an upper limit. Therefore, an excessive load {greater than the allowable load (upper limit)} caused in a vehicular collision and the like may deform the first front wall 3bF and the second front wall 3bS forward, respectively, relative to the first vehicular body fixture 3cF and the second vehicular body fixture 3cS.

Moreover, the upper clamp 3 is formed with a first wavy section 3dF and a second wavy section 3dS which are disposed between the first vehicular body fixture 3cF and the second vehicular body fixture 3cS. The first wavy section 3dF and the second wavy section 3dS are formed for the following cause:

A distance between the first side wall 3aF and the second side wall 3aS is formed greater than a predetermined distance, so as to secure a required width for each of the first side wall 3aF and the second side wall 3aS. The first wavy section 3dF and the second wavy section 3dS contribute to correction of the distance (between the first side wall 3aF and the second side wall 3aS) to the predetermined distance.

Outside the first wavy section 3dF and the second wavy section 3dS, there are defined a first through hole 3gF and a second through hole 3gS for inserting bolts which are used for fixing the upper clamp 3 to the vehicular body.

The side wall 3a is formed with an elongate hole 3f for a tilt bolt 13. The side wall 3a is determined in height for the following construction:

Even when the tilt bolt 13 reaches an uppermost section of the elongate hole 3f, at least a lower end of the side wall 3a can be prevented from protruding downward (in FIG. 3) from a lowermost section P on an outer periphery of the column jacket 1.

In other words, the above description can be interpreted as follows:

When the tilt bolt 13 is disposed substantially in the vertical center section of the elongate hole 3f as is seen in FIG. 1, the lower end of the side wall 3a reaches substantially a vertical center of the outer periphery of the column jacket 1 (in other words, on a level with an axial line C—C of the column jacket 1).

Figure 5A:
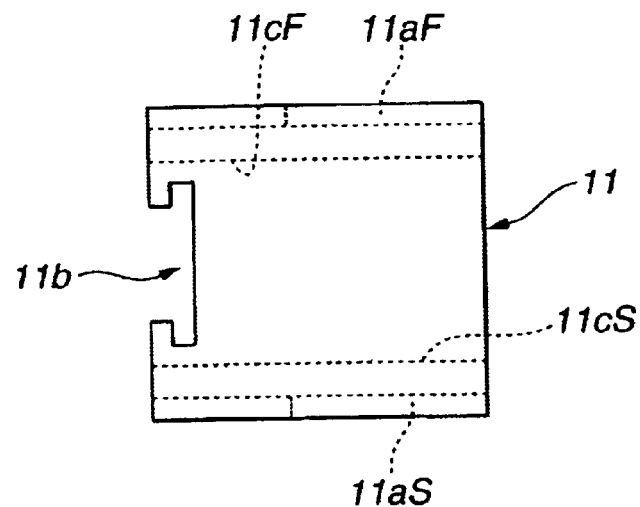
FIG. 5A is a plan view.
Figure 5B:
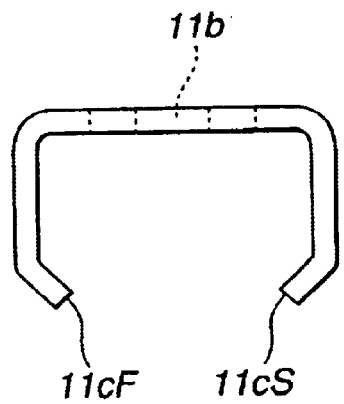
FIG. 5B is a front view.
Figure 5C:
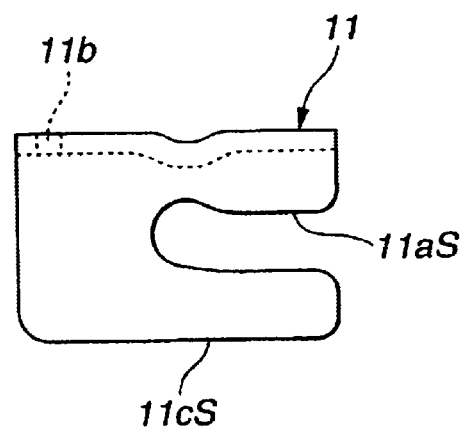
FIG. 5C is a side view.

Between the first side wall 3aF and the second side wall 3aS, there is interposed a distance bracket 11 in such a manner as to slide upward and downward. As is seen in FIG. 3 and FIG. 5B, the distance bracket 11 has a first lower end 11cF and a second lower end 11cS which couple with the upper outer periphery of the column jacket 1 through a welding and the like. As is seen in FIG. 5B, the distance bracket 11 has a cross section which is a groove wall shaped substantially into an English alphabet "C" turned clockwise by 90° (similar to a Japanese katakana character "⊐" turned counterclockwise by 90°). As is seen in FIG. 5A, an upper side wall of the distance bracket 11 has a front end {left end in FIG. 5A} formed with an engagement port 11b which is a cutout shaped substantially into an English alphabet "T" turned clockwise by 90°. The engagement port 11b is defined substantially in the center of the front end. As is seen in FIG. 5C, a right side wall and a left side wall of the distance bracket 11 are, respectively, formed with a first engagement groove 11aF and a second engagement groove 11aS. Each of the first engagement groove 11aF and the second engagement groove 11aS is shaped substantially into an English alphabet "U" turned clockwise by 90°, and opens rearward {rightward in FIG. 5C}. In addition, the distance bracket 11 defines a dent which is disposed substantially in a longitudinal middle section in the upper side wall. The dent can increase rigidity of the distance bracket 11, and opposes a curved bottom section of the English alphabet "U" of each of the first engagement groove 11aF and the second engagement groove 11aS.

The engagement groove 11a is so designed as to disengage from the tilt bolt 13 only when the excessive load {greater than the allowable load (upper limit)} is applied to the distance bracket 11 in a forward direction of the vehicle, and not disengage from the tilt bolt 13 when the applied load is not excessive (namely, smaller than or substantially equal to the upper limit).

Figure 6A:
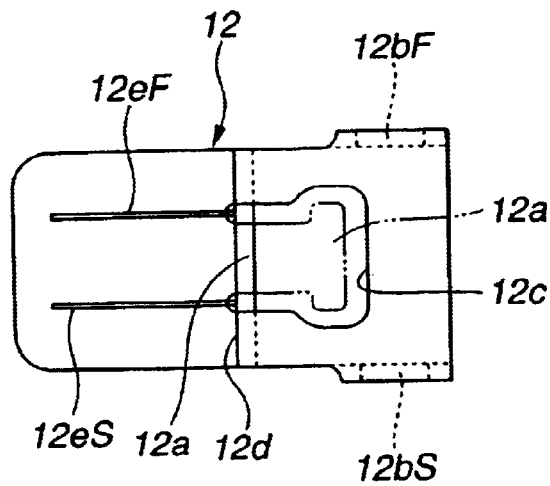
FIG. 6A is a plan view.
Figure 6B:
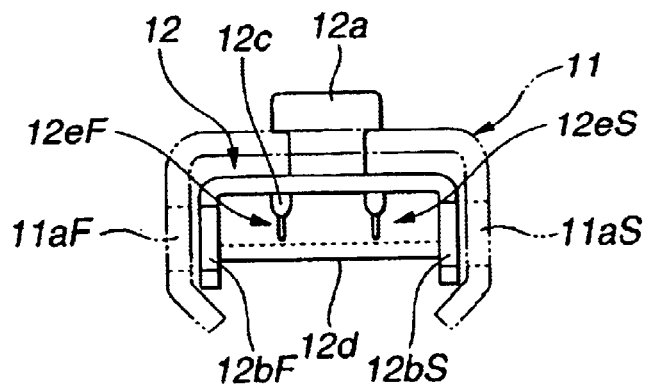
FIG. 6B is a front view.
Figure 6C:
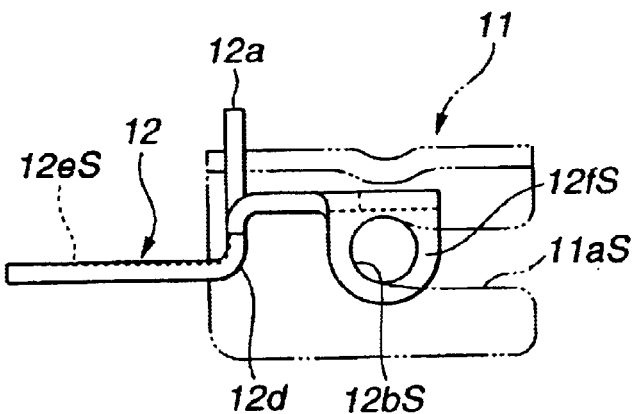
FIG. 6C is a side view.
Figure 7:
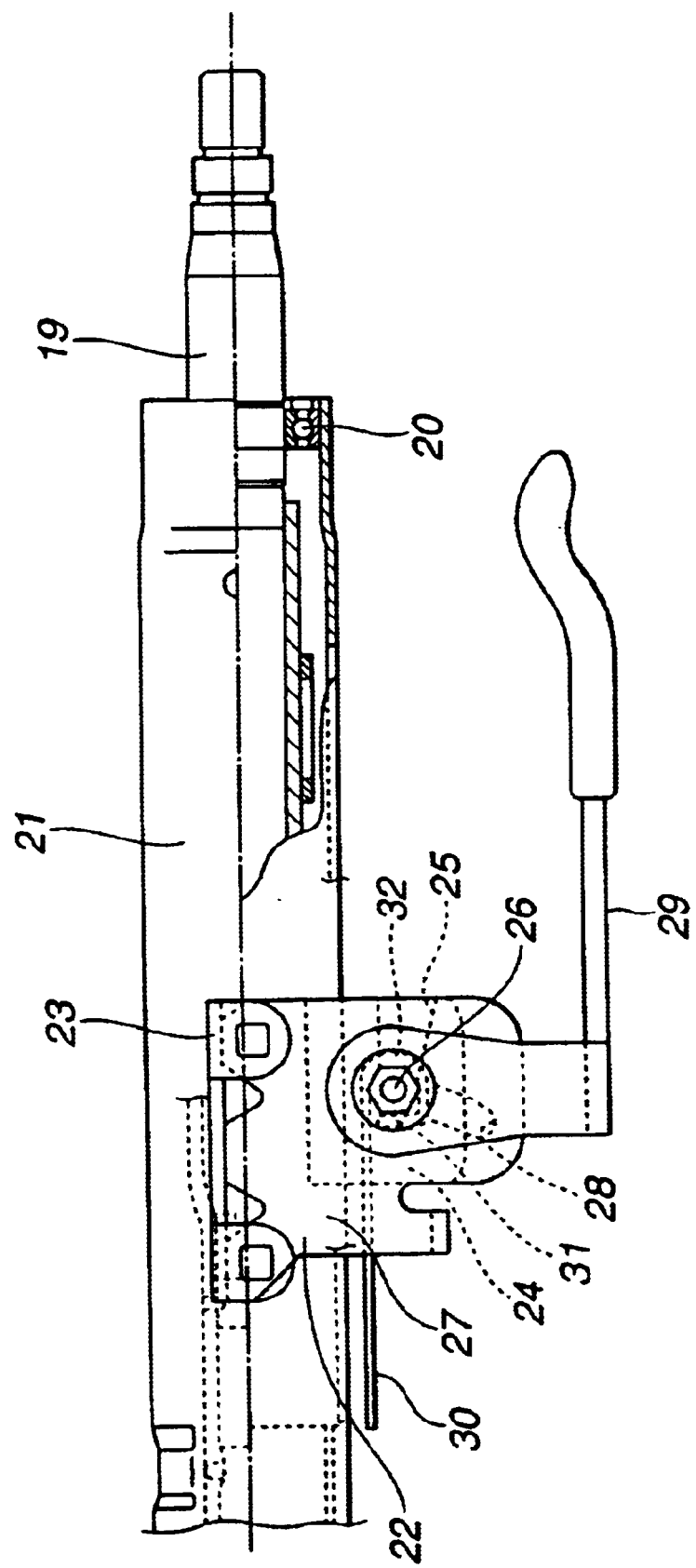
FIG. 7 is a side view of an essential part of a related art.

As is seen in FIG. 6A, FIG. 6B and FIG. 6C, there is provided an energy absorber 12 which is a metal plate having the following construction:

The energy absorber 12 is formed with an engagement section 12a shaped substantially into the English alphabet T. The energy absorber 12 is disposed in the distance bracket 11 such that the engagement section 12a can engage with the engagement port 11b. As is seen in FIG. 6B, the energy absorber 12 has a rear end which has a cross section shaped substantially into an English alphabet "C" turned clockwise by 90° (similar to a Japanese katakana character "⊐" turned counterclockwise by 90°). The energy absorber 12 has a first side wall 12fF and a second side wall 12fS which are formed, respectively, with a first circular hole 12bF and a second circular hole 12bS for inserting therein the tilt bolt 13. As is seen in FIG. 6C, the energy absorber 12 has substantially a center section bent in such a manner as to form a stage 12d, and a front end section extending forward relative to the distance bracket 11 by a predetermined length. As is seen in FIG. 6A, the engagement section 12a is formed through a punching, leaving a punched section 12c. The thus formed engagement section 12a is so formed as to stand (substantially erect) on the stage 12d, as is seen in FIG. 6C. Moreover, there are formed a first indent section 12eF and a second indent section 12eS extending respectively from a right end and a left end of the punched section 12c, substantially in parallel with a right side and a left side of the engagement section 12a.

With the above construction of the energy absorber 12, engaging the engagement section 12a with the engagement port 11b can integrate the energy absorber 12 with the distance bracket 11. In sum, the energy absorbing member can be of one piece construction of metal plate, and small in size, thus lowering cost.

Figure 2:
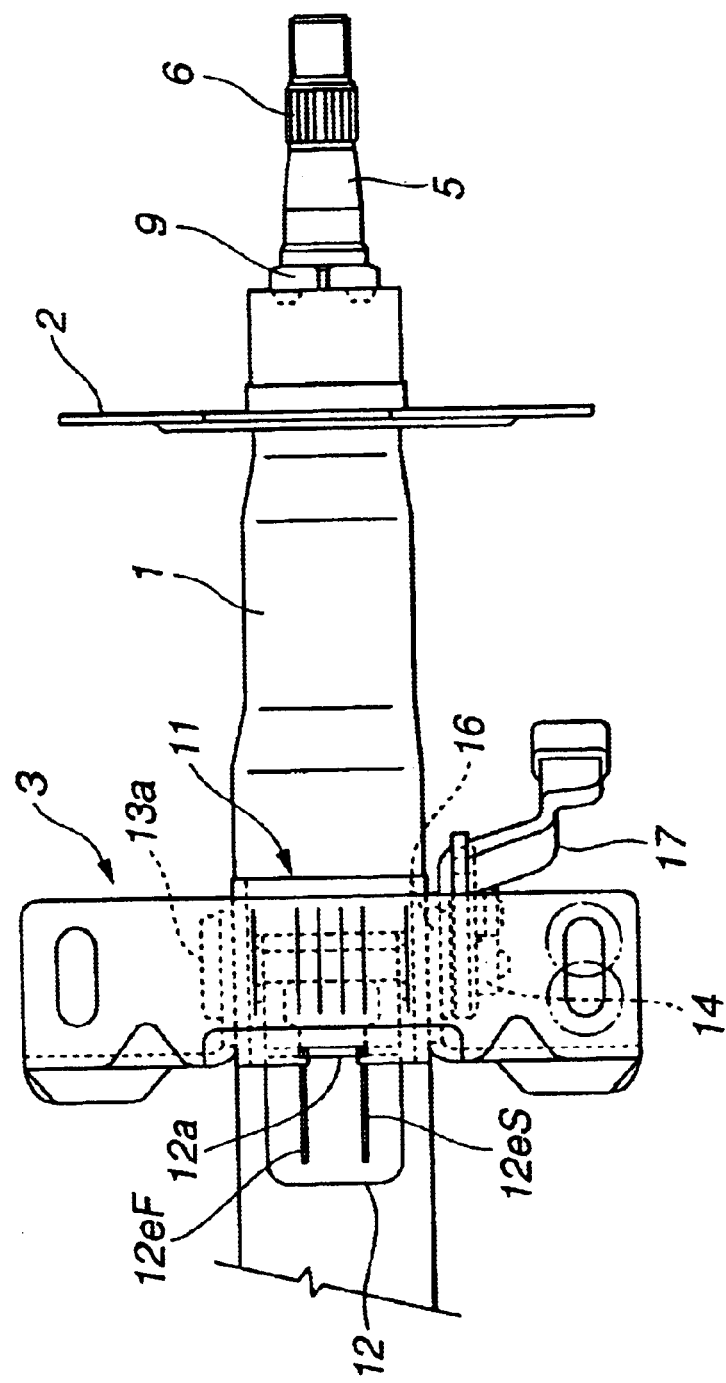
FIG. 2 is a plan view of an essential part of the shock-absorbing tilt type steering column, according to the embodiment of the present invention.

As is seen in FIG. 2 and FIG. 3, the tilt bolt 13 has a first end formed with a head section 13a, and a second end formed with a screw section 13b. The head section 13a is formed with a rotation stopper 13c which engages with the first elongate hole 3fF of the first side wall 3aF of the upper clamp 3. The tilt bolt 13 may be inserted in the following sequence:

1. the first elongate hole 3fF of the first side wall 3aF of the upper clamp 3.
2. the first engagement groove 11aF of the distance bracket 11.
3. the first circular hole 12bF of the energy absorber 12.
4. the second circular hole 12bS of the energy absorber 12.
5. the second engagement groove 11aS of the distance bracket 11.
6. the second elongate hole 3fS of the second side wall 3aS of the upper clamp 3.

Outside the second side wall 3aS (left in FIG. 3), the screw section 13b is inserted into a tightening plate 16 (for locking the tilt bolt 13) and a nut 14. The tightening plate 16 is formed with a rotation stopper 16a engaging with the second elongate hole 3fS. A tilt lever 17 is fixed to the nut 14 through the welding and the like in such a manner as to rotate integrally with the nut 14.

Figure 4:
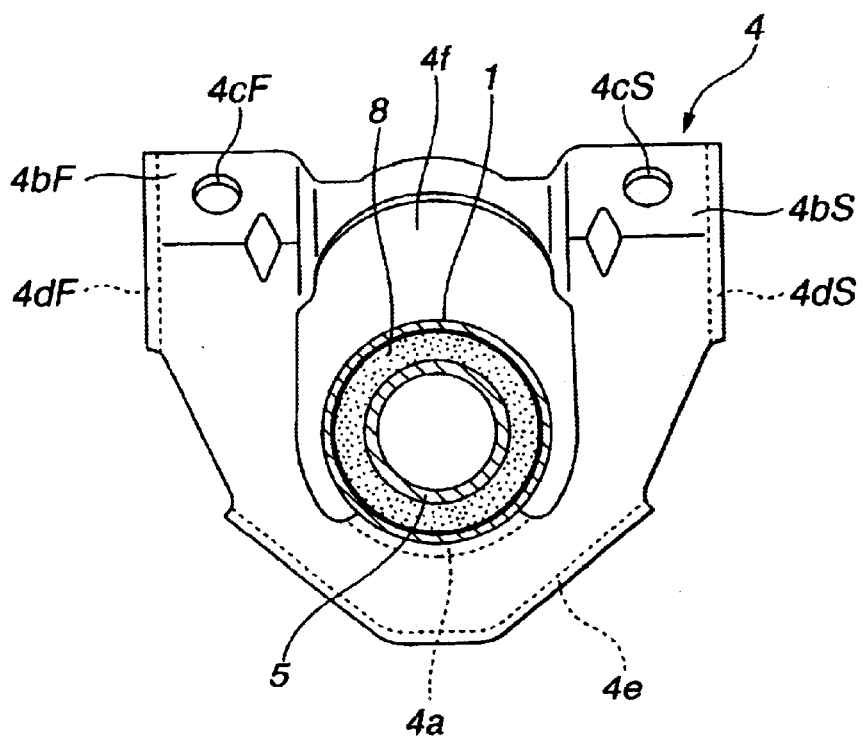
FIG. 4 is a front view in the direction IV in FIG. 1.

As is seen in FIG. 4, the lower clamp 4 is a metal plate formed with a cutout 4f, leaving an arc coupler 4a coupling (through the welding and the like) with a part of the outer periphery of the column jacket 1 at the front end of the column jacket 1. The lower clamp 4 has an upper section formed with a first plate 4bF and a second plate 4bS which face a mount section of the vehicular body. For inserting a bolt, the first plate 4bF defines a first through hole 4cF, while the second plate 4bS defines a second through hole 4cS. For greater strength of entire part of the lower clamp 4, there are formed a pair of a first upper flange 4dF and a second upper flange 4dS, and a lower flange 4e. The arc coupler 4a acts as a rotation center (fulcrum) of the column jacket 1 during tilt adjustment. Moreover, the arc coupler 4a is designed in strength such that the column jacket 1 can move in the axial direction when the shock is applied.

Hereinafter described is how shock absorption works with the shock-absorbing tilt type steering column having the construction described above.

Tilt adjustment of the column jacket 1 can be carried out in the following manner:

1. Use the tilt lever 17 to relax tightening strength caused by the tightening plate 16 which is disposed on the nut 14's side of the tilt bolt 13.
2. Turn the column jacket 1 upward or downward for tilt adjustment, to thereby adjust the column jacket 1 to a predetermined setting position.
3. Use the tilt lever 17 again so as to tighten the tightening plate 16.

In addition, there is shown in FIG. 3 an adjuster plate 15 for adjusting the tilt lever 17.

Hereinabove, the side wall 3a of the upper clamp 3 is so adjusted in height as to bring about the following operation:

Even when the tilt bolt 13 moves upward thereby reaching the uppermost section of the elongate hole 3f, the lower end of the side wall 3a does not protrude downward from the lowermost section P on the outer periphery of the column jacket 1.

Although the lowermost section P of the column jacket 1 may touch the seat occupant's knee or thigh, at least the lower end of the side wall 3a can be preferably prevented from touching the seat occupant's knee or thigh, thus securing a sufficient space above the seat occupant's knee or thigh.

A secondary collision by the seat occupant with the steering wheel may cause the stopper 9 of the steering shaft 5 to abut on the bearing 7, thereby applying a load to the column jacket 1 in the axial direction. The thus applied excessive load {greater than the allowable load (upper limit)} may move the pair of the first front wall 3bF (united with the first side wall 3aF) and the second front wall 3bS (united with the second side wall 3aS) by way of the tilt bolt 13. An initial load caused by the seat occupant's collision with the steering wheel can be absorbed by deformation of the upper clamp 3, thereby reducing the initial load at the secondary collision and reducing shock to the seat occupant.

Thereafter, the distance bracket 11 coupling with the column jacket 1 may move forward relative to the upper clamp 3 in such a manner as to disengage from the tilt bolt 13 by way of the first engagement groove 11aF and the second engagement groove 11aS which are facing rearward. On the other hand, the tilt bolt 13 can remain inserted through the upper clamp 3.

Then, the disengagement of the distance bracket 11 from the tilt bolt 13 may also move the engagement section 12a (engaging with the engagement port 11b of the distance bracket 11) of the energy absorber 12, thereby tearing the energy absorber 12 along the first indent section 12eF and the second indent section 12eS and bending the metal plate between the first indent section 12eF and the second indent section 12eS.

With the above tearing (of the energy absorber 12 along the first indent section 12eF and the second indent section 12eS) and bending (of the metal plate between the first indent section 12eF and the second indent section 12eS), the energy absorber 12 made of the metal can thus absorb the excessive load {greater than the allowable load (upper limit)} applied to the steering shaft 5.

In sum, according to the embodiment of the present invention, even when the tilt bolt 13 reaches the uppermost section of the elongate hole 3f formed in the side wall 3a of the upper clamp 3, at least the lower end of the side wall 3a can be prevented from protruding downward (in FIG. 3) from the lowermost section P on the outer periphery of the column jacket 1. Moreover, according to the embodiment of the present invention, the energy absorber 12 is interposed between an upper side of the column jacket 1 and the vehicle mounting section. With the above two features described in the embodiment of the present invention, the seat occupant's knee or thigh can be prevented from touching the lower section of the upper clamp 3, thus preventing any injury to the seat occupant's knee or thigh when the energy absorber 12 works.

Although the present invention has been described above by reference to certain embodiments, the present invention is not limited to the embodiments described above. Modifications and variations of the embodiments described above will occur to those skilled in the art, in light of the above teachings.

More specifically, according to the embodiment of the present invention, the energy absorber 12 is so constituted as to absorb the energy by both tearing (the energy absorber 12 along the first indent section 12eF and the second indent section 12eS) and bending (the metal plate between the first indent section 12eF and the second indent section 12eS). However, the energy absorber 12 can be the one that takes only one of the tearing and the bending of the metal plate.

The entire contents of basic Japanese Patent Application No. P2001-324426 (filed on Oct. 23, 2001 in Japan) from which priority is claimed is incorporated herein by reference, in order to take some protection against mistranslation or omitted portions.

The scope of the present invention is defined with reference to the following claims.

What is claimed is:

1. A shock-absorbing steering column, comprising:
   1) a column jacket having a lowermost section, a space being defined above the column jacket;
   2) a coupler;
   3) an upper clamp including a pair of a first side wall and a second side wall formed respectively with a first hole and a second hole for tilting the shock-absorbing steering column, the coupler being inserted into the first hole and the second hole, the space defined above the column jacket being defined in the upper clamp, each of the pair of the first side wall and the second side wall having such a height that a lower end thereof is disposed substantially on a level with or higher than the lowermost section of the column jacket when the coupler is disposed in an uppermost position of each of the first hole and the second hole;
   4) a distance bracket sandwiched between the first side wall and the second side wall of the upper clamp in such a manner as to move upward and downward, the distance bracket coupling with the column jacket, the distance bracket being adapted to engage with the coupler in such a manner as to be disengageable from the coupler in a forward direction of a vehicle when a load greater than an upper limit is applied to the distance bracket axially in a direction along the column jacket, the distance bracket being disposed in the space with the lower end of each of the first side wall and the second side wall disposed substantially on the level with or higher than the lowermost section of the column jacket; and
   5) an energy absorber interposed between the distance bracket and the coupler.

2. The shock-absorbing steering column as claimed in claim 1, wherein the energy absorber is a metal plate comprising:
   a rear end section adapted to engage with the coupler, and
   a front end section extending forward by a first predetermined length from the distance bracket; and
   the energy absorber is partly bent in such a manner as to form an engagement section which stands upward by a second predetermined length and engages with the distance bracket.

3. The shock-absorbing steering column as claimed in claim 2, wherein
   the energy absorber is formed with a first indent section and a second indent section extending substantially in parallel with the engagement section standing upward.

4. The shock-absorbing steering column as claimed in claim 1, wherein
   the upper clamp further includes a first front wall united with the first side wall and a second front wall united with the second side wall,
   the upper clamp further includes a first fixture united with the first front wall and a second fixture united with the second front wall, the first fixture and the second fixture being fixed to the vehicle, the first front wall and the second front wall being bent, respectively, from the first fixture and the second fixture, and the first front wall and the second front wall are deformable in the forward direction of the vehicle when receiving the load greater than the upper limit.

5. The shock-absorbing steering column as claimed in claim 1, wherein
   the coupler is a tilt bolt for tilting the shock-absorbing tilt type steering column, and
   each of the first hole and a second hole is elongated substantially upward and downward.

6. The shock-absorbing steering column as claimed in claim 5, wherein
   the upper clamp further includes a pair of a first reinforcement and a second reinforcement which are, respectively, so machined as to reinforce a first fold section defined between the first front wall and the first fixture and a second fold section defined between the second front wall and the second fixture.

7. The shock-absorbing steering column as claimed in claim 6, wherein
   the upper clamp further includes a first wavy section and a second wavy section which are disposed between the first fixture and the second fixture.

8. The shock-absorbing steering column as claimed in claim 7, wherein
   the distance bracket has a first lower end and a second lower end which couple with an upper outer periphery of the column jacket through a welding and the like,
   the distance bracket has a cross section which is a groove wall shaped substantially into an English alphabet C,
   an upper side wall of the distance bracket has a front end formed with an engagement port which is a cutout shaped substantially into an English alphabet T, the engagement port being defined substantially in a center of the upper side wall of the distance bracket,
   a right side wall and a left side wall of the distance bracket are, respectively, formed with a first engagement groove and a second engagement groove, each of the first engagement groove and the second engagement groove being shaped substantially into an English alphabet U, and opening rearward, and
   the distance bracket defines a dent which is disposed substantially in a longitudinal middle section in the upper side wall, the dent increasing a rigidity of the distance bracket, and opposing a curved bottom section of the English alphabet U of each of the first engagement groove and the second engagement groove.

9. The shock-absorbing steering column as claimed in claim 8, wherein
   the first engagement groove and the second engagement groove of the distance bracket are so constituted as to disengage from the tilt bolt only when the load greater than the upper limit is applied to the distance bracket in the forward direction of the vehicle, and not disengage from the tilt bolt when the applied load is smaller than or substantially equal to the upper limit.

10. The shock-absorbing steering column as claimed in claim 9, wherein
    the engagement section of the energy absorber is shaped substantially into an English alphabet T, the energy absorber being disposed in the distance bracket such that the engagement section engages with the engagement port of the distance bracket.

11. The shock-absorbing steering column as claimed in claim 10, wherein
    the energy absorber has a rear end which has a cross section shaped substantially into an English alphabet C, the energy absorber has a first side wall and a second side wall which are formed, respectively, with a first circular hole and a second circular hole for inserting therein the tilt bolt, the energy absorber has substantially a center section bent in such a manner as to form a stage, and a front end section extending forward relative to the distance bracket by a predetermined length, the engagement section of the energy absorber is formed through a punching, leaving a punched section, and the thus formed engagement section is so formed as to stand substantially erect on the stage, the first indent section and the second indent section extend respectively from a right end and a left end of the punched section, substantially in parallel with a right side and a left side of the engagement section.

12. The shock-absorbing steering column as claimed in claim 11, wherein the engagement section of the energy absorber adapted to engage with the engagement port of the distance bracket integrates the energy absorber with the distance bracket, resulting in one piece construction of the metal plate.

13. The shock-absorbing steering column as claimed in claim 12, wherein the distance bracket has the following construction:
when the load greater than the upper limit is applied to the distance bracket axially in the direction along the column jacket, the distance bracket coupling with the column jacket moves forward relative to the upper clamp in such a manner as to disengage from the tilt bolt by way of the first engagement groove and the second engagement groove which are facing rearward while the tilt bolt remains inserted through the upper clamp.

14. The shock-absorbing steering column as claimed in claim 13, wherein the energy absorber has the following construction:
the disengagement of the distance bracket from the tilt bolt moves the engagement section of the energy absorber, thereby causing at least one of the following:
tearing the energy absorber along the first indent section and the second indent section, and
bending the metal plate between the first indent section and the second indent section.

15. A shock-absorbing steering system, comprising:
1) a column jacket shaped substantially into a cylinder having a lowermost section, the column jacket defining a center section and a front end side, a space being defined above the column jacket;
2) a coupler;
3) an upper clamp disposed in the center section of the column jacket, the upper clamp including a pair of a first side wall and a second side wall formed respectively with a first hole and a second hole, the coupler being inserted into the first hole and the second hole, the space defined above the column jacket being defined in the upper clamp, each of the pair of the first side wall and the second side wall having such a height that a lower end thereof is disposed substantially on a level with or higher than the lowermost section of the column jacket when the coupler is disposed in an uppermost position of each of the first hole and the second hole;
4) a distance bracket sandwiched between the first side wall and the second side wall of the upper clamp in such a manner as to move upward and downward, the distance bracket coupling with the column jacket, the distance bracket being adapted to engage with the coupler in such a manner as to be disengageable from the coupler in a forward direction of a vehicle when a load greater than an upper limit is applied to the distance bracket axially in a direction along the column jacket, the distance bracket being disposed in the space with the lower end of each of the first side wall and the second side wall disposed substantially on the level with or higher than the lowermost section of the column jacket;
5) an energy absorber interposed between the distance bracket and the coupler; and
6) a lower clamp disposed on the front end side of the column jacket.

16. The shock-absorbing steering system as claimed in claim 15, wherein the energy absorber is a metal plate comprising:
a rear end section adapted to engage with the coupler, and
a front end section extending forward by a first predetermined length from the distance bracket; and
the energy absorber is partly bent in such a manner as to form an engagement section which stands upward by a second predetermined length and engages with the distance bracket.

17. The shock-absorbing steering system as claimed in claim 16, wherein the energy absorber is formed with a first indent section and a second indent section extending substantially in parallel with the engagement section standing upward.

18. The shock-absorbing steering system as claimed in claim 15, wherein the coupler is a tilt bolt for tilting the shock-absorbing tilt type steering column, and
each of the first hole and a second hole is elongated substantially upward and downward.

19. The shock-absorbing steering system as claimed in claim 15, wherein the lower clamp is a metal plate formed with a cutout, leaving an arc coupler coupling with a part of an outer periphery of the column jacket,
the lower clamp has an upper section formed with a first plate and a second plate which face a mount section of a vehicular body,
the first plate defines a first through hole, while the second plate defines a second through hole, and
the lower clamp is formed with a pair of a first upper flange and a second upper flange, and a lower flange.

* * * * *